United States Patent [19]

King

[11] Patent Number: 5,575,335

[45] Date of Patent: Nov. 19, 1996

[54] METHOD FOR STIMULATION OF SUBTERRANEAN FORMATIONS

[75] Inventor: Dwain G. King, Duncan, Okla.

[73] Assignee: Halliburton Company, Duncan, Okla.

[21] Appl. No.: 493,874

[22] Filed: Jun. 23, 1995

[51] Int. Cl.⁶ ................................................. E21B 43/267
[52] U.S. Cl. ........................... 166/280; 166/308; 507/924
[58] Field of Search .................................. 166/250.1, 280, 166/308, 75.15; 507/904, 924

[56] References Cited

U.S. PATENT DOCUMENTS

| | | | |
|---|---|---|---|
| 3,195,634 | 7/1965 | Hill | 166/308 X |
| 3,224,506 | 12/1965 | Huitt et al. | 166/308 X |
| 3,310,112 | 3/1967 | Nielsen et al. | |
| 3,368,627 | 2/1968 | Hurst et al. | |
| 3,372,752 | 3/1968 | Prater | 166/280 |
| 3,664,422 | 5/1972 | Bullen | 166/283 |
| 3,980,136 | 9/1976 | Plummer et al. | 166/280 |
| 4,627,495 | 12/1986 | Harris et al. | 166/280 |
| 4,911,241 | 3/1990 | Williamson et al. | 166/280 X |
| 5,423,205 | 6/1995 | Farchone | 166/280 X |

*Primary Examiner*—George A. Suchfield
*Attorney, Agent, or Firm*—Robert A. Kent

[57] ABSTRACT

The invention discloses a method of effecting fracturing in a subterranean formation utilizing substantially constant density fluids whereby proppant segregation is minimized or eliminated within the formation. Fluid density is adjusted by varying the salt content or addition of a gas or gasifiable liquid or both as proppant is added to the treatment fluid.

20 Claims, No Drawings

5,575,335

METHOD FOR STIMULATION OF SUBTERRANEAN FORMATIONS

BACKGROUND OF THE INVENTION

1. Field of the Invention

This invention relates to a method of fracturing subterranean formations penetrated by a wellbore utilizing aqueous fluids that may include carbon dioxide or nitrogen or hydrocarbon fluids that may include nitrogen. More particularly, this invention relates to a method of fracturing a subterranean formation and transporting proppant into created fractures utilizing substantially uniform density fluids.

2. Description of the Prior Art

The treatment of subterranean formations penetrated by a wellbore to stimulate the production of hydrocarbons therefrom or the ability of a formation to accept injected fluids has long been known in the art. One of the most common methods of increasing productivity of a hydrocarbon-bearing formation is to subject the formation to a fracturing treatment. This treatment is effected by injecting a liquid, gas or two-phase fluid which generally is referred to as a fracturing fluid down the wellbore at sufficient pressure and flow rate to fracture the subterranean formation. A proppant material such as sand, fine gravel, sintered bauxite, glass beads or the like can be introduced into the fractures to keep them open. The propped fracture provides larger flow channels through which an increased quantity of a hydrocarbon can flow, thereby increasing the productive capability of a well.

A traditional fracturing technique utilizes a water or oil-based fluid to fracture a hydrocarbon-bearing formation.

Another successful fracturing technique has been that known as "foam-fracturing." This process is described in, for example, U.S. Pat. No. 3,980,136. Briefly, that process involves generation of a foam of a desired "Mithcell quality" which then is introduced through a wellbore into a formation which is to be fractured. The composition of the foam is such that the Mitchell foam quality at the bottom of the well is in the range of from about 0.53 to 0.99. Various gases and liquids can be used to create the foam, but foams generally used in the art are made from nitrogen and water, in the presence of a suitable surfactant. The pressure at which the foam is pumped into the well is such that it will cause a fracture of the hydrocarbon-bearing formation. Additionally, the foam comes out of the well easily when the pressure is released from the wellhead, because the foam expands when the pressure is reduced.

Yet another fracturing technique has been that utilizing a liquified, normally gaseous fluid. U.S. Pat. No. 3,195,634 for example, discloses a method for treating a subterranean formation penetrated by a wellbore with a composition comprising a liquid—liquid mixture of carbon dioxide and water. The carbon dioxide is present in an amount equivalent to from about 300 to about 1500 SCF at 80° F. and 14.7 psia per 42 gallons of water. The composition is injected into the formation under sufficient pressure to fracture the formation. The composition can include gelling agents and proppant materials. Upon pressure release at the wellhead, the liquid carbon dioxide vaporized and flows from the formation.

U.S. Pat. No. 3,310,112 discloses a method of fracturing a subterranean formation penetrated by a wellbore comprising introduction of a mixture of liquid carbon dioxide and a propping agent slurried in a suitable vehicle into the wellbore at a pressure sufficient to fracture the formation. The liquid carbon dioxide is present in an amount sufficient to provide at least five volumes of carbon dioxide per volume of slurried propping agent. After injection of the mixture of liquid carbon dioxide containing the propping agent slurried in a suitable vehicle, the pressure on the wellbore is released. The liquid carbon dioxide normally is heated sufficiently by the formation that upon pressure release the liquid changes to a gas. A substantial portion of the carbon dioxide then leaves the well and forces or carries out with it an appreciable amount of the oil or aqueous vehicle utilized to transport the proppant.

U.S. Pat. No. 3,368,627 discloses a method of treating a formation penetrated by a wellbore which consists essentially of injecting down the wellbore a fluid azeotropic mixture which has a critical temperature sufficiently high or a critical pressure sufficiently low to remain a liquid at the temperature and pressure existing during injection and treatment of the formation. The fluid mixture has critical properties such that a substantial portion of the injected fluid is converted to a gas upon a release of the pressure applied to the liquid during injection into the formation. The fluid mixture consists essentially of carbon dioxide and at least one $C_2$ to $C_6$ hydrocarbon.

U.S. Pat. No. 3,664,422 discloses a method of treating a subsurface earth formation penetrated by a wellbore comprising injection of a liquified gas together with a gelled alcohol into the formation at a pressure sufficient to fracture the formation. The liquified gas is returned from the formation by vaporization following pressure reduction on the wellbore. The gelled alcohol is removed by vaporization during subsequent production from the well leaving only the broken gelling agent in the formation.

U.S. Pat. No. 4,627,495 discloses a method of treating a subsurface formation and placing a proppant material utilizing a carbon dioxide or nitrogen containing fluid. The volume of carbon dioxide or nitrogen is adjusted as proppant is admixed with the fluid to maintain a substantially constant internal phase ratio in the treatment fluid.

A problem or concern that is not addressed by the foregoing is the potential for proppant to segregate within the fractures as a result of the different densities of the fluids and the varying proppant material concentrations contained in the fluids introduced into the subterranean formation. It would be desirable to provide a treatment which would substantially eliminate or avoid proppant material segregation while achieving appropriate proppant concentrations within the formation.

SUMMARY OF THE INVENTION

The present invention related to a method of stimulating a subterranean formation penetrated by a wellbore and achieving uniform distribution of proppant without undesired gravity segregation of the proppant within created fractures.

More particularly, the present invention provides a method of treating a subterranean formation utilizing substantially uniform density aqueous or hydrocarbon fluids. The aqueous fluids are prepared with or without the addition of various salts such as sodium chloride, potassium chloride, ammonium chloride, tetramethyl ammonium chloride, calcium or zinc chloride, bromides and the like to the fluid. As increasing quantities of proppant are added to the fluid during the treatment of a subterranean formation. The amount of salts or other weighting agent is decreased or nitrogen gas or carbon dioxide is added to the fluid or the density of the slurry is adjusted by a combination of weighting agent reduction and gas addition such that the density of the fluid during the duration of the treatment is maintained substantially uniform. As the proppant concentration increases, the quantity of salts in the fluid can be reduced to reduce or eliminate the quantity of nitrogen gas or other agent required to adjust the density of the fluid. The maintenance of a substantially uniform density in the fluid assists in minimizing any gravity segregation that may occur within the fluids as they pass down through the wellbore and enter the formation uniformly displacing the previously introduced fluid deeper into the formation.

DESCRIPTION OF THE PREFERRED EMBODIMENT

In the practice of the present invention, a treatment fluid, such as a fracturing fluid is prepared by admixing an aqueous liquid with a gelling agent and/or various salts to adjust the density of the fluid to a desired level. Thereafter, as a proppant is admixed with the fluid, nitrogen gas may be admixed with the fluid to adjust the density of the treatment fluid, or aqueous fluids with reduced salt content may be used to maintain a substantially constant fluid density. The treatment fluid also may be prepared with hydrocarbon liquids, various gelling agents and nitrogen may be admixed with the fluid to adjust the density of the treatment fluid.

The aqueous liquid can comprise substantially any aqueous solution which does not adversely react with the other constituents of the treatment fluid, the subterranean formation or the hydrocarbons present therein. The aqueous liquid can comprise, for example, fresh water, brine, brackish water, water-alcohol mixtures or the like.

The water soluble salts can comprise, for example, sodium chloride, potassium chloride, ammonium chloride, tetramethyl ammonium chloride, calcium or zinc chloride, bromides and the like.

In a preferred embodiment, a gelling agent is admixed with the aqueous liquid prior to admixing with any proppant. The gelling agent can comprise, for example, hydratable polymers which contain in sufficient concentration and reactive position, one or more of the functional groups, such as, hydroxyl, cis-hydroxyl, carboxyl, sulfate, sulfonate, amino or amide. Particularly suitable such polymers are polysaccharides and derivatives thereof which contain one or more of the following monosaccharide units: galactose, mannose, glucoside, glucose, xylose, arabinose, fructose, glucuronic acid or pyranosyl sulfate. Natural hydratable polymers containing the foregoing functional groups and units include, but are not limited to, guar gum and derivatives thereof, locust bean gum, tara, konjak, tamarind, starch, cellulose and derivatives thereof, karaya, xanthan, tragacanth and carrageenan.

Hydratable synthetic polymers and copolymers which contain the above-mentioned functional groups and which can be utilized in accordance with the present invention include, but are not limited to, polyacrylate, polymethacrylate, polyacrylamide, maleic anhydride methylvinyl ether copolymers, polyvinyl alcohol and polyvinylpyrrolidone.

Various compounds can be utilized with the above mentioned hydratable polymers in an aqueous solution to inhibit or retard the hydration rate of the polymers, and therefore, delay a viscosity increase in the solution for a required period of time. Depending upon the particular functional groups contained in the polymer, different inhibitors react with the functional groups to inhibit hydration. For example, inhibitors for cis-hydroxyl functional groups include compounds containing multivalent metals which are capable of releasing the metal ions in an aqueous solution, borates, silicates and aldehydes. Examples of the multivalent metal ions are chromium, zirconium, antimony, titanium, iron (ferrous or ferric), tin, zinc and aluminum. Inhibitors for hydroxyl functional groups include mono and di-functional aldehydes containing from about 1 to about 5 carbon atoms and multivalent metal salts that form hydroxide. Multivalent metal salts or compounds can be utilized as inhibitors for the hydroxyl functional groups. Inhibitors for amides include aldehydes and multivalent metal salts or compounds. Generally, any compound can be used as an inhibitor for a hydratable polymer if the compound reacts or otherwise combines with the polymer to crosslink, form a complex or otherwise tie-up the functional groups of the polymer whereby the rate of hydration of the polymer is retarded. The inhibitor, when present, is admixed with the aqueous liquid in an amount of from about 0.001 to about 10.0 percent by weight of the aqueous liquid.

As stated above, the functional groups contained in the polymer or polymers utilized must be in sufficient concentration and in a reactive position to interact with the inhibitors. Preferred hydratable polymers which yield high viscosities upon hydration, that is, apparent viscosities in the range of from about 10 centipoise to in excess of about 90 centipoise at a concentration in the range of from about 10 lbs/1000 gallons to about 80 lbs/1000 gallons in water, are guar gum and guar derivatives such as hydroxypropyl guar, hydroxyethylguar and carboxymethylguar, cellulose derivatives such as hydroxyethylcellulose, carboxymethylcellulose, and carboxymethylhydroxyethyl-cellulose, locust bean gum, carrageenan gum and xanthan gum. Xanthan gum is a biopolysaccharide produced by the action of bacteria of the genus xanthomomas. The hydration of the polymers can be inhibited or retarded by various inhibitors present in the aqueous liquid. The reversal of the inhibition of such polymers by the inhibitors can be accomplished by a change in the pH of the solution or by heating the solution to an appropriate temperature, generally above about 140° F.

Examples of some of the inhibitors which can be utilized depending upon the particular polymer or polymers used in the aqueous liquid are sodium sulfite-sodium dichromate, aluminum sulfate, titanium triethanolamine chelate, basic potassium pyroantimonate, zinc chloride, iron chloride, tin chloride, zirconium oxychloride in the hydrochloric acid solution, sodium tetraborate and glyoxal. The gelled aqueous liquid thus formed can be used to transport significant quantities of proppant material to the point of mixing with the nitrogen gas. The proppant material can comprise, for example, sand, graded gravel, glass beads, sintered bauxite, resin coated sand or the like.

Under differing conditions of pH or temperature, the inhibitors identified above may function as crosslinking agents to increase the viscosity of the gelled aqueous liquid by crosslinking the gelling agents after hydration. The crosslinking agent, when present, is admixed with the aqueous gelled fluid in an amount sufficient to effect crosslinking of the hydrated gelling agent. The crosslinking agent can be present in an amount of from about 0.001 to about 3.0 percent by weight of the aqueous fluid.

The proppant material is admixed with the gelled fluid prior to admixing with the nitrogen or carbon dioxide. The admixing of the proppant material with the gelled fluid can be effected in any suitable mixing apparatus, such as for example, a batch mixer, a continuous mixer or the like. The amount of proppant admixed with the gelled fluid may be varied to provide the desired concentration in the subterranean formation. The proppant can be admixed with the aqueous liquid in an amount of from about zero pounds per gallon of aqueous liquid up to as many pounds of proppant per gallon as may be pumped by the available equipment. Generally the quantity will range from about ½ to about 32 pounds per gallon of aqueous liquid. The size and type of the proppant may be varied during the treatment of the formation to achieve desired proppant distributions within a subterranean formation.

Initially, in a fracturing process, the treatment fluid must be introduced into the formation in an amount sufficient to establish a fracture in the subterranean formation. Such a fracture generally will have a wedge-shaped geometry tapered from the wellbore. The proppant initially is introduced into the created fracture at a low concentration in the transport fluid because of the generally higher fluid-loss to the formation experienced by the initially introduced treatment fluid. If the proppant material is introduced in too great a quantity initially, the fluid-loss to the formation from the treatment fluid may be so great as to cause a "sand-out" by premature deposition of the proppant from the treatment fluid resulting in blockage of the fracture. The initially introduced fluid desirably establishes some form of fluid-loss control whereby successively larger quantities of proppant material can be introduced into the fracture with the subsequently injected treatment fluid.

As proppant is added to the fluid, the density of the fluid is adjusted by a change in the salt concentration present in the fluid, the addition of nitrogen gas, carbon dioxide or the like to provide a substantially constant density to the fluid regardless of the proppant concentration.

Preferably, the aqueous fluid includes a surfactant capable of foaming within the fluid upon introduction of the gas. The surfactant can comprise a cationic, anionic, nonionic or amphoteric compound such as, for example, beaines, sulfated or sulfonated alkoxylates, alkyl quaternary amines, alkoxylated linear alcohols, alkyl sulfonates, alkyl aryl sulfonates, $C_{10}C_{20}$ alkyldiphenyl ether sulfonates, ethoxylated nonylphenols and the like. The particular surfactant employed will depend upon the other constituents of the fluid and the type of formation, being treated. The surfactant generally is admixed with the aqueous fluid in an amount of from about ½ to about 20 gallons per 1000 gallons of fluid to provide a surfactant concentration of from about 0.05 to about 2 percent by weight.

In accordance with the method of the present invention, the gelled aqueous fluid is introduced into the subterranean formation to be treated at a rate and pressure sufficient to create at least one fracture in the formation. The quantity of gas added to the fluid is adjusted as previously indicated as the quantity of proppant increases. Alternatively, the quantity of salts present may be reduced or the quantity of salts may be reduced while still introducing a quantity of gas. After introduction of the full amount of the calculated or estimated volume of fracturing fluid necessary to fracture the formation and transport the desired quantity of proppant into the created fracture, the wellbore is shut-in for a period of time sufficient to permit stabilization of the subterranean formation. In one embodiment the well is shut-in for a period of time to permit the formation to at least partially close upon the proppant material and stabilize the fracture volume. The shut-in period can be from several minutes to in excess of 12 hours. After the formation has stabilized, the well is opened under controlled conditions and treatment fluid is flowed back from the formation and into the wellbore for return to the surface.

When hydrocarbon liquids are utilized as the treatment fluid, the gelling agent can comprise any of the know process employing orthophosphate esters and ferric or aluminium salts. The hydrocarbon liquid can comprise diesel oil, crude oil, kerosene, gasoline or any other hydrocarbon liquids which do not adversely react with the other constituents of the fluid, the formation or the hydrocarbons present therein. The gelled hydrocarbon fluid is introduced into the fomation in the same manner as described hereinbefore for the gelled aqueous fluids. In this instance however, the density is maintained by the addition of nitrogen gas to the fluid as the quantity of proppant is increased rather than the adjustment of the salt content as for the aqueous fluids.

It is to be understood that while reference has been made to "maintaining a substantially constant density" during the treatment, this is not intended to mean that the density may not increase or decrease during the treatment. It is merely intended to mean that the fluid density does not experience the significant swings that would occur in the absence of adjusting the salt content or gas content or both of the fluid during the performance of the treatment. The avoidance of such significant changes has been found to effectively prevent undesired gravity segregation of the proppant within the created fracture.

To further illustrate the method of the present invention, and not by way of limitation, the following example is provided.

EXAMPLE

A fracturing treatment is performed on a well in the Lewis formation. The well is perforated at a depth of about 4800 feet over a distance of about 40 feet. The bottomhole temperature is about 138° F. The treatment is effected by pumping the treatment fluid through 2.441 inch diameter tubing positioned in the wellbore.

A pad of 5000 gallons of aqueous base fluid containing 6% by weight potassium chloride, 30 pounds per gallon of fluid of carboxethylhydroxy propyl guar, a crosslinking comprising a zirconium-ion source present in an amount of 0.8 gallon per 1000 gallons of fluid. Four gallons per 1000 gallon of fluid of an alkyl sulfonate surfactant and 2 gallons per 1000 gallons of an ethoxylated nonylphenol surfactant, about 5 pounds per 1000 gallons of fluid of a persulfate breaker and 0.3 pounds per 1000 gallons of fluid of a bactericide was pumped into the wellbore at a rate and pressure sufficient to initiate fracturing in the formation. A first foam stage containing 22% nitrogen by volume of fluid was prepared with the base fluid and introduced into the wellbore in an amount of 2500 gallons of foam including 1 pound of 20/40 mesh proppant per gallon of foam. A second stage containing 37% nitrogen was prepared with the base fluid and introduced into the wellbore in an amount of 2500 gallons of foam including 2.5 pounds of proppant per gallon of foam. A third stage containing 52% nitrogen was prepared with the base fluid and introduced into the wellbore in an amount of 2500 gallons of foam including 4 pounds of proppant per gallon of foam. A fourth stage containing 70% nitrogen was prepared with the base fluid and introduced into the wellbore fluid and introduced into the wellbore in an amount of 20,000 gallons of foam including 6 pounds of proppant per gallon of foam.

The fourth stage was followed by about 1200 gallons of a flush comprising the base fluid. The entire volume of treatment fluid is introduced into the created fracture together with the transported proppant While preferred embodiments of the invention have been described herein, changes or modifications in the method may be made by an individual skilled in the art without departing from the spirit or scope of the invention as set forth in the appended claims.

What is claimed is:

1. A method of treating a subterranean formation penetrated by a wellbore comprising:

preparing an aqueous treatment fluid having an initial predetermined density containing an aqueous gelling agent;

introducing the treatment fluid into the subterranean formation through the wellbore at a rate and pressure sufficient to create at least one fracture in said formation, admixing proppant with at least a portion of said treatment fluid and adjusting the density of the resultant fluid by addition of a gas or gasifiable liquid or adjustment of the quantity of a water soluble salt added to said treatment fluid to maintain a substantially constant density in the fluid in relation to the initial predetermined density, introducing the proppant-containing treatment fluid into the created fracture and depositing said proppant in said fracture to create a flow path from said formation to said wellbore.

2. The method of claim 1 wherein said gelling agent comprises a hydratable polymer present in an amount of from about 10 to about 80 pounds per 1000 gallons of aqueous fluid.

3. The method of claim 1 wherein said aqueous treatment fluid is defined further to include a surfactant.

4. The method of claim 3 wherein said surfactant is present in a concentration in the range of from about 0.05 to about 2.0 percent by weight.

5. The method of claim 3 wherein said surfactant comprises at least one member selected from the group consisting of alkyl quaternary amines, betaines, sulfated or sulfonated alkoxylates, alkyl quaternary amines, alkoxylated linear alcohols, alkyl sulfonates, alkyl aryl sulfonates, $C_{10}$–$C_{20}$ alkyldiphenyl ether sulfonates and ethoxylated nonylphenols.

6. The method of claim 1 wherein said gelling agent comprises at least one member selected from the group consisting of guar gum and guar derivatives, locust bean gum, carrageenan gum, xanthan gum, cellulose derivatives, polyacrylates, polymethacrylates, polyacrylamides, polyvinyl pyrrolidone and copolymers of said compounds.

7. The method of claim 1 wherein said proppant is present in said portion of said treatment fluid in an amount of from about ½ to about 32 pounds per gallon of aqueous fluid.

8. The method of claim 1 wherein said water soluble salt comprises at least one member selected from the group consisting of potassium chloride, sodium chloride, calcium chloride, ammonium chloride, zinc chloride, calcium bromide and zinc bromide.

9. The method of claim 1 wherein said treatment fluid is defined further to include a crosslinking agent for said gelling agent that is present in an amount sufficient to crosslink at least a portion of said fluid whereby the treatment fluid viscosity is caused to increase above the uncrosslinked viscosity.

10. A method of fracturing a subterranean formation penetrated by a wellbore comprising:

preparing an aqueous treatment fluid having an initial density by hydration of a gelling agent in an aqueous fluid having quantities of at least one water soluble salt admixed therewith, introducing said treatment fluid into said subterranean formation through said wellbore at a rate and pressure sufficient to create at least one fracture in said formation, admixing proppant with at least a portion of said treatment fluid and adjusting the density of the resultant fluid by adjustment of the quantity of soluble salt added to said treatment fluid or addition of a gas to said fluid whereby the density of said resultant fluid is maintained at a substantially constant density comparable to said aqueous treatment initial fluid density prior to proppant addition, introducing the proppant-containing resultant fluid into the created fracture, and depositing at least a portion of said proppant in said fracture.

11. The method of claim 10 wherein said aqueous treatment fluid is defined further to include a surfactant.

12. The method of claim 11 wherein said surfactant is present in a concentration in the range of from about 0.05 to about 2.0 percent by weight.

13. The method of claim 11 wherein said surfactant comprises at least one member selected from the group consisting of alkyl quaternary amines, betaines, sulfated or sulfonated alkoxylates, alkyl quaternary amines, alkoxylated linear alcohols, alkyl sulfonates, alkyl aryl sulfonates, $C_{10}$–$C_{20}$ alkyldiphenyl ether sulfonates and ethoxylated nonylphenols.

14. The method of claim 10 wherein said gelling agent comprises at least one member selected from the group consisting of guar gum and guar derivatives, locust bean gum, carrageenan gum, xanthan gum, cellulose derivatives, polyacrylates, polymethacrylates, polyacrylamides, polyvinyl pyrrolidone and copolymers of said compounds.

15. The method of claim 10 wherein said proppant is present in said portion of said treatment fluid in an amount of from about ½ to about 32 pounds per gallon of aqueous fluid.

16. The method of claim 10 wherein said water soluble salt comprises at least one member selected from the group consisting of potassium chloride, sodium chloride, calcium chloride, zinc chloride, ammonium chloride, calcium bromide and zinc bromide.

17. The method of claim 10 wherein said treatment fluid is defined further to include a crosslinking agent for said gelling agent that is present in an amount sufficient to crosslink at least a portion of said fluid whereby the treatment fluid viscosity is caused to increase above the uncrosslinked viscosity.

18. The method of claim 17 wherein said crosslinking agent comprises a source of zirconium ions, titanium ions, antimony ions or a borate source.

19. A method of fracturing a subterranean formation penetrated by a wellbore comprising:

preparing a gelled treatment fluid having an initial predetermined density, introducing said treatment fluid into said subterranean formation through said wellbore at a rate and pressure sufficient to create at least one fracture in said formation, admixing proppant with at least a portion of said treatment fluid and adjusting the density of the resultant proppant laden fluid by addition of a gas to said fluid whereby the density of said resultant fluid is maintained at a substantially constant density comparable to said initial treatment fluid density prior to proppant addition, introducing said resultant fluid into said created fracture in said formation and depositing at least a portion of said proppant in said fracture.

20. The method of claim 19 wherein said gas is nitrogen and said treatment fluid is selected from gelled hydrocarbon liquids.

* * * * *